United States Patent [19]

Kehr et al.

[11] Patent Number: 4,771,090

[45] Date of Patent: Sep. 13, 1988

[54] COATING COMPOSITIONS FOR A POLYMER-MODIFIED ROOFING AND WATERPROOFING SHEET

[75] Inventors: Helmut Kehr, Schermbeck; Horst Denzel, Marl, both of Fed. Rep. of Germany

[73] Assignee: Huels Aktiengesellschaft, Marl, Fed. Rep. of Germany

[21] Appl. No.: 75,388

[22] Filed: Jul. 20, 1987

Related U.S. Application Data

[62] Division of Ser. No. 838,981, Mar. 12, 1986, Pat. No. 4,707,413.

[30] Foreign Application Priority Data

Mar. 14, 1985 [DE] Fed. Rep. of Germany ....... 3509037

[51] Int. Cl.$^4$ ................... C08L 23/12; C08L 23/16; C08L 23/18; C08L 95/00
[52] U.S. Cl. .................. 524/68; 427/407.1; 427/407.3; 524/70; 524/71
[58] Field of Search ............. 524/68, 70, 71; 427/407.1, 407.3

[56] References Cited

U.S. PATENT DOCUMENTS 4,081,502  3/1978  Bluemel et al. ............ 524/71
4,659,759  4/1987  Jeranoff et al. ............ 524/68

FOREIGN PATENT DOCUMENTS 0009432  4/1980  European Pat. Off. .
2517056  10/1976  Fed. Rep. of Germany ........ 524/70
2288126  5/1976  France .
1400145  7/1975  United Kingdom ............. 524/70

Primary Examiner—Allan M. Lieberman
Attorney, Agent, or Firm—Millen & White

[57] ABSTRACT

Compositions comprising 15 to 20% amorphous olefin copolymer, 3 to 5% ethene-propene-ethylidine norbornene terpolymer of the sequence type with 25 to 30% propene content, 6 to 8% double bonds, and raw strength 10 MPa, 60 to 82% distilled bitumen, 0 to 3% isotactic polypropylene, 0 to 15% filler and 0 to 1% antioxidizing agent, when heat-sealed to a layer of oxidized bitumen, form a stable bond therewith and thus can be used to form a waterproofing surface coat on fibrous roofing sheets.

7 Claims, No Drawings

COATING COMPOSITIONS FOR A POLYMER-MODIFIED ROOFING AND WATERPROOFING SHEET

This is a division of application Ser. No. 838,981 filed Mar. 12, 1986, now U.S. Pat. No. 4,707,413.

BACKGROUND OF THE INVENTION

This invention relates to a coating containing polyolefins for a roofing and waterproofing sheet (felt) which can be durably heat-sealed with oxidized bitumen.

It is customary today to produce roofing and waterproofing sheet by saturation/impregnation and/or coating of a reinforcement material of inorganic or organic fiber material or sheetings with polymer-modified meltable bituminous material. A distinction is made according to DIN 52 130 V (draft July 1983) and DIN 52 131 V (draft July 1983) between elastomer-modified and plastomer-modified sheets. Elastomer-modified sheets generally contain coatings formed from mixtures of elastomers, e.g., SBS block copolymers, with bitumen. Plastomer-modified sheets generally contain coatings formed from mixtures of thermoplastic polyolefins with straight-run bitumen. Polyolefins which are generally used are the so-called atactic polypropylenes (and copolymers, generally ethylene-propylene copolymers), as they are produced as by-products in the production of the so-called isotactic polypropylenes, i.e., homo- and co-polymers, at times mixed with isotactic polypropylene. The added amount of polyolefins generally is 25 to 40% by weight. The polyolefin-modified bitumen has outstanding high resistance to aging.

The polyolefin-modified roofing sheets are generally produced in such a thickness, e.g., 4 mm and more, that they can be superficially liquefied by flaming with a gas burner (torching), thereby heat-sealing themselves and with the underlayer. Most European guidelines for the design of flat roofs prescribe a two-layer system when using bituminous sheets for the roofing. For reasons of cost, for the underlayer, which is not exposed to weathering, a conventional roofing felt prepared from oxidized bitumen often would be used and a torching sheet of polymer-modified bitumen would be used for the upper layer exposed to weathering. Torching of a polymer-modified sheet to an existing, older roofing membrane made from oxidized bitumen is also often used in repairing leaky roofs.

Experience has shown that although a polyolefin-modified roofing felt can indeed be heat-sealed to a roofing sheet impregnated with oxidized bitumen (grades 100/25 and 100/40 according to DIN 1995, which correspond to ASTM asphalt grades Type IV and Type III, respectively, being used predominantly), which is often used on roofs, over time the heat-sealing loses its initial tenacity with the formation of a greasy interlayer. As a result, the use of polyolefin-modified roofing sheets, which otherwise exhibit basically desirable properties, is now limited to situations where heat-sealing to a roofing sheet or felt of oxidized bitumen is not required, e.g., loose laying under a ballasting and roofs of two layers of polyolefin-modified bitumen.

Addition of rubber to mixtures of amorphous polyolefins and bitumen are known in the art. However, they are used only for improving mechanical properties such as elasticity, elongation at rupture, and low temperature flexibility, for which other types of rubber become necessary, than for stabilizing the heat-sealing with oxidized bitumen.

Thus, BE Patent Specification No. 813 416 describes mixtures of an ethylene-propylene rubber, polyolefins and bitumen, in which the rubber is used for improving the mechanical resistance. However, it is a random rubber ("copolymère au hasard") in which the diene content expressly plays no role. The use according to the invention of a strongly unsaturated sequence EPDM runs diametrically counter to the teaching of this patent specification. Further, it is not to be gathered from this specification that the mixtures are suitable for producing coatings according to the invention.

U.S. Pat. No. 3,669,918 also teaches that ethylene-propylene copolymers of the random type are used for improving the flexibility and toughness of the bitumen. But mixtures of the type according to the invention are not described there.

Finally, U.S. Pat. No. 4,420,524 claims an improved prefabricated, multilayer roofing membrane with an impregnating material, which besides bitumen can contain atactic polypropylene and an amorphous copolymer of ethylene and propylene. However, this amorphous copolymer is not at all the commonly marketed EPM or EPDM, but a by-product of polypropylene copolymer production, for which there was no use up til now. Further, the object of this U.S. patent is a multilayer sheet, which is laid as a single-ply membrane and thus the problem of heat-sealing to an existing layer of oxidized bitumen is not involved.

OBJECTS OF THE INVENTION

It is an object of the invention to provide novel coatings containing polyolefins adapted for heat-bonding to sheet material adapted for use as a roofing material. It is another object to provide such a coating which can be durably heat-sealed to a roofing membrane formed from oxidized bitumen. Other objects will be apparent to those skilled in the art to which this invention pertains.

SUMMARY OF THE INVENTION

In a composition aspect, this invention relates to a coating composition suitable for heat-sealing to a roofing membrane formed from oxidized bitumen, which composition memcomprises:

(a) 15 to 20% by weight of an amorphous copolymer of propylene and butene-1 and optionally also ethylene,
(b) 3 to 5% by weight of an EPDM,
(c) 82 to 60% by weight of straight run bitumen,
(d) 0 to 3% by weight of an isotactic polypropylene,
(e) 0 to 15% by weight of a conventional filler,
(f) 0 to 1% by weight of an antioxidizing agent.

In other composition aspects of this invention, a roofing and waterproofing sheet comprising one or more reinforcing layers of fibrous material having bonded to a face thereof a composition of this invention and to roofs of buildings covered and waterproofed therewith.

In a method aspect, this invention relates to a method for water-proofing roofs covered by a sheet or layer of organic and/or inorganic fiber material, which preferably is impregnated with a bitumen composition, which comprises heat sealing to the outer surface thereof a composition of this invention.

DETAILED DISCUSSION

As used herein, the term "copolymer of propylene and butene-1 and optionally also ethylene" means a copolymer whose polymer units are derived from propene and butene-2 and optionally ethylene" respectively.

Copolymers (a) used according to the invention can be produced, e.g., by polymerization of α-olefins in a liquid hydrocarbon on Ziegler type catalysts at moderate pressures and temperatures. They have a viscosity number J of 20 to 200 cm$^3$/g, preferably from 50 to 150 cm$^3$/g, especially about 60 to 110 cm$^3$/g, a solubility in boiling n-heptane of 80 to 100% and a ring-and-ball softening point of 80° to 160° C.

The composition of the copolymers is 25 to 70% by weight of propylene, 20 to 70% by weight of butene-1 and 0 to 15% by weight of ethylene.

The dispersibility in bitumen runs through a minimum, if propylene and n-butene-1 are present to a ratio of about 1:1. Therefore, copolymers in which either propylene or n-butene-1 polymer units are preponderant are preferred.

A preferred composition of amorphous copolymer (a) comprises 0 to 15% by weight of ethylene, 60 to 70% by weight of propylene and 20 to 30% by weight of n-butene-1. Such copolymers have a J value of 70 to 90 cm$^3$/g, a melt viscosity at 190° C. of 10 to 40, preferably 20 to 40 Pa s, and a ring-and-ball softening point of >150° C.

Another preferred composition of amorphous copolymer (a) comprises 0 to 15% by weight of ethylene, 25 to 35% by weight of propylene and 60 to 70% by weight of n-butene-1. Such copolymers have a J value of 60 to 80 cm$^3$/g, a melt viscosity at 190° C. of 10 to 40, preferably 15 to 30 Pa s, and a ring-and-ball softening point of >150° C.

Another preferred composition of amorphous copolymer (a) comprises 0 to 15% by weight of ethylene, 60 to 70% by weight of propylene and 20 to 30% by weight of n-butene-1. Such copolymers have a J value of 90 to 110 cm$^3$/g, a melt viscosity at 190° C. of 40 to 150, preferably 80 to 150 Pa s, and a ring-and-ball softening point of >150° C.

With rising molecular weight of component (a), expressed by the J value, the plastifying and elastifying action on the bitumen increases and, of course, the expenditure of mixing energy increases also.

The copolymers (a) are compatible with the atactic polypropenes that are usually used. For this reason it is possible in the context of the invention to replace the copolymer (a) at least partially by atactic polypropylene, e.g., up to about 40% by weight thereof, preferably no more than about 35% by weight thereof.

EPDM (b) is a highly unsaturated ethylene-propylene-ethylidene norbornene terpolymer of the sequence type with high green strength (>10MPa). Such polymers typically contain 25 to 30% by weight of propylene polymer units and about 6 to 8 double bonds per 1000 C. atoms. Although the vulcanization characteristics of this type of polymer is very fast, this is merely a characterizing property of the rubber, since the mixtures according to the invention function well without vulcanization.

Table 1 shows the properties of EPDM type 1 employed in this invention and also those of types 2 to 6 which are not employed in this invention.

The so-called straight run bitumen is usually obtained from the residue of atmospheric crude oil distillation by vacuum distillation and/or light oxidation. The ring and ball softening points of the various grades are between about +35 and about +70° C. Grades with a ring and ball softening point of below +60° C. are preferred for modifying by polymers. The most widely used is grade B 200 (according to DIN 1995) with a ring and ball softening point of 37 to 44° C. and a penetration of 160 to 210 0.1mm. Occasionally, grade B 80 (according to DIN 1995) with a ring and ball softening point of 44 to 49° C. and a penetration of 70 to 100 0.1 mm is used. Basically, mixtures of various grades can also be used. It is also possible to modify the properties of the bitumen by the addition of mineral oil, fatty acid pitch, adhesion promoters, plant root resistant agents, etc.

Conventional isotactic polypropylene, e.g., a homopolymer with a melt index of 2 to 100 g/10′, preferably 35 to 90 g/10′ (by the ISO/R 1133 method), is suitable as component (d), by whose addition an enhancement of the hardness can be achieved, if desired.

A slate flour, for example, is suitable as filler (e) which can be added to enhance the slope stability and to reduce the cost of the composition. It is obtained by grinding of a clay slate occurring in nature, a sedimentary rock consisting of clay minerals and quartz. The particle size is usually under 90 μm. Slate flour, because it is largely insoluble in acids, is a preferred filler in the roofing sheet industry. Other fillers, such as limestone and electrostatic precipitator ash, can also be employed.

Conventional antioxidants known in the art can be used as antioxidizing agent f), e.g., pentaerythritryl-tetrakis[3-(3,5-di-tert-butyl-4-hydroxyphenyl)-propionate] (available as IRGANOX 1010 from CIBA).

The compositions according to the invention can be produced by introduction of the polymers and optionally additives into the hot bitumen with subsequent mixing. For faster and better solubilizing of the EPDM, the use of shearing mixers is recommended. However, it is also possible to use simple stirrers. The bitumen is heated until it is fluid enough that the amorphous copolymer and EPDM and any optional ingredients can be uniformly mixed therewith. Mixing procedures conventionally employed for forming compositions based upon bitumen can be employed. Filler e) is advantageously introduced after the polymers are mixed with the bitumen.

As a test, 4-mm thick cast sheetings from the test mixtures are heat-sealed with a Bunsen burner on a 4-mm thick torching sheet of oxidized bitumen with a glass fabric reinforcement, marketed under the designation GW 4. In this case, both the surface of the cast sheeting and also the surface of the bitumen torching sheet are liquefied, so that the materials, when put together, flow into one another. As specified in the U.E.A.t.c. (General Directive for the Assessment of Roof Waterproofing Systems, European Union of Agreement) guidelines, the test pieces are placed in a circulating air oven at +70° C. and the heat-sealing is assessed after 7, 14 and 28 days.

Surprisingly and only according to the invention, only the use of the olefin copolymer component (a) to 20% by weight along with an EPDM of sequence type (b) with quite specific properties leads to the desired objectives.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

EXAMPLES

Examples of bitumen-amorphous copolymer-EPDM compositions are summarized in Table 2. Each of the mixtures are produced according to the following uniform process:

The total amount of composition produced in each case is 1300 g. Bitumen (c) of type B 200 with 200° C. is introduced and then the polymers are introduced in the sequence (b) (EPDM), optionally (d) (isotactic polypropylene), (c) (amorphous olefin copolymer). When all components are plasticized, mixing is performed for 30 more minutes at about 200° C. Then any optional filler is added in small portions, with mixing. For the mixing procedure, a shearing laboratory mixer type LDD 1168 of Silverson Machines Ltd., Chesham, Bucks, UK, is used. Then the material is cooled with slow stirring with a laboratory stirrer to about 180° C. The composition can then be cast into 4-mm thick sheets. After 24 hours, the test samples for the heat-sealing are taken from these sheets.

All mixtures of Table 2 yield plastomer-type coatings which meet the requirements with respect to softening point and low-temperature flexibility. However, durable heat-sealing with a roofing sheet (felt) impregnated with oxidized bitumen is provided only by those coatings which, in accordance with this invention, contain no more than 20% by weight of amorphous olefin copolymer and 3 to 5% by weight of a highly unsaturated, very rapidly vulcanizing sequence EPDM with a high green strength and ethylidene norbornene as termonomer. Particularly surprising is the fact that the type and amount of termonomer play a decisive role, even though no vulcanization is performed.

The materials can be used in a conventional manner for the production of roofing and waterproofing sheet by applying them in a molten state onto one or both sides of the reinforcement material of organic and/or inorganic fibrous material. Suitable reinforcement materials are, e.g., polyester mat, preferably with a mass per unit area of 150 to 300 g/m$^2$, glass fabric, preferably with a mass per unit area of 150 to 200 g/m$^2$, and fiber glass mats, e.g., of about 100 g/m$^2$ mass per unit area. The reinforcement material is preimpregnated/-saturated or not, depending on the type of the reinforcement, before applying the coating. The coating itself or another polymer-modified bitumen or polymer-free bitumen is used for preimpregnation/saturation.

TABLE 1

| | | Properties of EPDM types used | | | |
|---|---|---|---|---|---|
| | Termonomer | $C_3$ | Double bonds/ 1000 C | Vulcanization Characteristics | Polymer type | Green Strength |
| EPDM 1 | EN | ~25% | ~8 | Very fast | Sequence | ~11 MPa |
| EPDM 2 | EN | ~40% | ~8 | Very fast | Random | <1 MPa |
| EPDM 3 | EN | ~30% | ~8 | Very fast | Sequence | ~6 MPa |
| EPDM 4 | EN | ~37% | ~11 | Very fast | Random | <1 MPa |
| EPDM 5 | EN | ~25% | ~2 | Medium | Sequence | ~11 MPa |
| EPDM 6 | HX | ~25% | ~5 | Fast | Sequence | ~9 MPa |

EN = Ethylidene norbornene
HX = Hexadiene

TABLE 2

| | Mixture No. | | | | | | | |
|---|---|---|---|---|---|---|---|---|
| | 1 | 2 | 3 | 4 | 5 | 6 | 7 | 8 |
| Amorphous copolymer parts by wt 7% $C_2$, 63% $C_3$, 30% n-$C_4$, J value = 80 cm$^3$/g | 25 | 25 | 22 | 18 | 20 | 20 | 20 | 20 |
| Bitumen parts by wt Sft Pt R&B 38° C. Pen.: 200 0.1 mm | 75 | 62.5 | 62 | 76 | 77 | 64 | 64 | 64 |
| Isotact. PP parts by wt MFI 190/5:50 g/10' | | 2.5 | 3 | 3 | | 3 | 3 | 3 |
| EPDM 1 parts by wt | | | 3 | 3 | 3 | 3 | | |
| EPDM 2 parts by wt | | | | | | | 3 | |
| EPDM 3 parts by wt | | | | | | | | 3 |
| EPDM 4 parts by wt | | | | | | | | |
| EPDM 5 parts by wt | | | | | | | | |
| EPDM 6 parts by wt | | | | | | | | |
| Slate flour parts by wt | | 10 | 10 | | | 10 | 10 | 10 |
| Irganox 1010$^3$ parts by wt | 0.2 | 0.2 | 0.2 | 0.2 | 0.2 | 0.2 | 0.2 | 0.2 |
| Sft. Pt. R&B °C. DIN 52 011 | 149 | 154 | 156 | 152 | 149 | 156 | 157 | 156 |
| Pen. 0.1 mm DIN 52 010 | 44 | 31 | 25 | 30 | 48 | 24 | 32 | 29 |
| Low temp. flexibility °C. DIN 52 123 | −20/−25 | −25/−30 | −25/−30 | −20/−25 | −20/−25 | −20/−25 | −20/−25 | −20/−25 |
| Heat-sealing with GW4 | | | | | | | | |
| Fresh | + | + | + | + | + | + | + | + |
| After aging 28 d at 70° C. | − | − | − | + | + | + | − | − |

| | Mixture No. | | | | | | | |
|---|---|---|---|---|---|---|---|---|
| | 9 | 10 | 11 | 12 | 13 | 14 | 15 | 16 |
| Amorphous copolymer parts by wt | 20 | 20 | 20 | 18 | 20$^1$ | 20$^2$ | 20 | 20 |

TABLE 2-continued

|  | | | | | | | | |
|---|---|---|---|---|---|---|---|---|
| 7% C$_2$, 63% C$_3$, 30% n-C$_4$, J value = 80 cm$^3$/g | | | | | | | | |
| Bitumen parts by wt Sft Pt R&B 38° C. Pen.: 200 0.1 mm | 64 | 64 | 64 | 77 | 64 | 64 | 65 | 66 |
| Isotact. PP parts by wt MFI 19015:50 g/10' | 3 | 3 | 3 | | 3 | 3 | 3 | 3 |
| EPDM 1 parts by wt | | | | 5 | 3 | 3 | 2 | 1 |
| EPDM 2 parts by wt | | | | | | | | |
| EPDM 3 parts by wt | | | | | | | | |
| EPDM 4 parts by wt | 3 | | | | | | | |
| EPDM 5 parts by wt | | 3 | | | | | | |
| EPDM 6 parts by wt | | | 3 | | | | | |
| Slate flour parts by wt | 10 | 10 | 10 | | 10 | 10 | 10 | 10 |
| Irganox 1010$^3$ parts by wt | 0.2 | 0.2 | 0.2 | 0.2 | 0.2 | 0.2 | 0.2 | 0.2 |
| Sft. Pt. R&B °C. DIN 52 011 | 153 | 156 | 156 | 142 | 156 | 156 | 157 | 157 |
| Pen. 0.1 mm DIN 52 010 | 31 | 26 | 25 | 46 | 23 | 25 | 25 | 27 |
| Low Temp. Flexibility °C. DIN 52 123 | −25/−30 | −20/−25 | −20/−25 | −20/−25 | −20/−25 | −15/−20 | −20/−25 | −20/−25 |
| Heat-sealing with GW 4 | | | | | | | | |
| Fresh | + | + | + | + | + | + | + | + |
| After aging 28 d at 70° C. | − | − | − | + | + | + | o | − |

$^1$⅓ of the amorphous copolymer is replaced by an atactic polypropylene with the following properties: Melt visc. at 190° C.; 3000 mPa s, Pen. 20 0.1 mm, Sft Pt R&B 158° C.
$^2$An amorphous copolymer with the following characteristics was used: 4% C$_2$; 32% C$_3$; 64% n-C$_4$, J value = 65 cm$^3$/g
$^3$Pentaerythrityl-tetrakis[3-(3,5-di-tert-butyl-4-hydroxyphenyl)-propionate]
+ = Very good adhesion
o = Moderate adhesion
− = Poor to no adhesion The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A bitumen-containing composition comprising, by weight:
   (a) 15 to 20% of an amorphous copolymer of 25–75% by weight of propylene, 20–70% by weight of butene-1 and 0–15% by weight of ethylene, alone or in admixture with up to 40% by weight of atactic polypropylene,
   (b) 3 to 5% of an EPDM,
   (c) 60 to 82% of a distilled bitumen obtained from the residue of atmospheric crude oil distillation by vacuum distillation or light oxidation, having a ring and ball softening point of about 35° to about 70° C.,
   (d) 0 to 3% of an isotactic polypropylene,
   (e) 0 to 15% of a conventional filler,
   (f) 0 to 1% of an antioxidizing agent, wherein the EPDM is an ethylene-propylene-ethylidene norbornene terpolymer of the sequence type with 25 to 30% by weight of propylene, 6 to 8 double bonds per 1000 C atoms and a green strength of >10 MPa.

2. A composition according to claim 1, wherein amorphous copolymer (a) consists essentially of 0 to 15% by weight of ethylene, 60 to 70% by weight of propylene and 20 to 30% by weight of n-butene-1 polymer units, has a J value of 70 to 90 cm$^3$/g, a melt viscosity at 190° C. of 10 to 40 Pa s and a ring-and-ball softening point of >150° C.

3. A coating composition according to claim 1, wherein amorphous copolymer (a) consists essentially of 0 to 15% by weight of ethylene, 25 to 35% by weight of propylene and 60 to 70% by weight of n-butene-1 polymer units, has a J value of 60 to 80 cm$^3$/g, a melt viscosity at 190° C. of 10 to 40 Pa s and a ring-and-ball softening point of >150° C.

4. A coating composition according to claim 1, wherein amorphous copolymer (a) consists essentially of 0 to 15% by weight of ethylene, 60 to 70% by weight of propylene and 20 to 30% by weight of n-butene-1 polymer units, has a J value of 90 to 110 cm$^3$/g, a melting viscosity at 190° C. of 40 to 150 Pa s and a ring-and-ball softening point of >150° C.

5. A composition according to claim 1, wherein amorphous copolymer (a) is in admixture with atactic polypropylene.

6. A composition according to claim 1, wherein the bitumen has a ring and ball softening point below about 60° C.

7. A composition according to claim 1, wherein the bitumen has a ring or ball softening point of about 37° to about 44° C.

* * * * *